United States Patent

Stevens

[15] 3,647,411

[45] Mar. 7, 1972

[54] PACKAGED COMPOSITION FOR ENHANCING THE GROWTH OF PLANTS

[72] Inventor: George D. Stevens, Marinette, Wis. 54143

[22] Filed: Apr. 2, 1970

[21] Appl. No.: 25,281

Related U.S. Application Data

[63] Continuation-in-part of Ser. No. 856,230, Aug. 4, 1969, Pat. No. 3,532,485, which is a continuation-in-part of Ser. No. 609,709, Dec. 27, 1969, abandoned.

[52] U.S. Cl. .................................71/1, 71/63, 222/402.1
[51] Int. Cl. .................................C05d 7/00, B65d 83/00
[58] Field of Search ............71/1, 54, 58, 63; 222/402.1, 222/402.16

[56] References Cited

UNITED STATES PATENTS

| | | | |
|---|---|---|---|
| 2,861,723 | 11/1958 | Cooksley | 222/402.16 |
| 3,197,302 | 7/1965 | MacBride | 71/63 |
| 3,250,606 | 5/1966 | Murray | 71/1 |
| 3,393,842 | 7/1968 | Bruce et al | 222/402.1 |

Primary Examiner—Reuben Friedman
Assistant Examiner—Charles N. Hart
Attorney—Robert J. Zellner

[57] ABSTRACT

A packaged composition for enhancing the growth of plants provides pressurized discharge of a plant nutrient solution for application to the foliage of plants. The solution contains a large quantity of dissolved $CO_2$ and is expelled from the container by $CO_2$ at above atmospheric pressure.

6 Claims, No Drawings

PACKAGED COMPOSITION FOR ENHANCING THE GROWTH OF PLANTS

BACKGROUND OF THE INVENTION

This application is a continuation in part of application Ser. No. 856,230 filed Aug. 4, 1969 and now U.S. Pat. No. 3,532,485 which is itself a continuation in part of application Ser. No. 609,709 filed Dec. 27, 1966 and now abandoned.

With plant growth being of such great importance to life on earth, it might be supposed that optimal conditions for photosynthesis would be found within the range of climates existing in the world. The light intensity in full sunlight is usually more than adequate and, in most geographical locations temperature is not limiting. Plants are mainly composed of carbohydrates, i.e., sugars and starches compounds of C, H and O. The H and O are obtained from the water absorbed by the plant roots but the only source of carbon is $CO_2$ in the air. But strangely, most plants grow under circumstances in which the $CO_2$ supply is a limiting factor in photosynthesis. This is especially true in still air conditions where layering of air over the leaf surface permits localized depletion of the $CO_2$ supply.

Paradoxically, attempts to increase the rate of plant growth by increasing the concentration of $CO_2$ to an amount substantially above that normally prevailing in the atmosphere, i.e., about 0.03 percent produces a toxic reaction in the plant after a short time. Consequently, there remains a need for a composition to furnish quantities of $CO_2$ to plants to obtain consistently improved rates of growth and for a device to store the composition and to apply it to the plants.

THE INVENTION

This invention relates to a packaged composition for enhancing the growth of plants and has for an object the furnishing of large amounts of $CO_2$ to plant foliage without a toxic reaction by the plants. Another object of the invention is the provision of a plant nutrient composition containing $CO_2$ at superatmospheric pressure and supersaturated (with respect to the atmosphere) with $CO_2$. Another object of this invention is the provision of a pressurized package of plant nutrient solution having a valve to discharge the contents under pressure to plant foliage.

These and other objects are achieved through provision of a pressure vessel provided with a valve to discharge the contents under pressure, the contents comprising a carbonated aqueous nutrient solution for application to the foliage of plants and over the solution, in the head space within the container, $CO_2$ gas at above atmospheric pressure. The solution may contain minor or trace elements essential for plant growth.

The minor or trace elements are boron, copper, cobalt, iron, manganese, molybdenum, and zinc. The aqueous nutrient solution may contain a mixture of all of them; those skilled in the art will recognize the concentration of trace nutrients to be employed for the plant species under cultivation.

The quantity of $CO_2$ in the nutrient composition is in excess of that which is in equilibrium with the air, that is, it has dissolved more than three grams per liter and may have as much as fifty grams per liter.

The pressure vessel package for the composition may be a molded plastic, fiber-reinforced container such as glass-reinforced epoxy or polyester, or it may be a vessel of metal such as steel, desirably lined with an acid resistant material such as a lacquer or an enamel. A valve is provided to discharge the contents under pressure so that the nutrient solution may be applied to the foliage of plants preferably as a spray. Large-volume vessels, i.e., those having a capacity of more than a gallon or two, may be fitted with a pressure gauge to indicate the gas pressure within the vessel.

The packaged composition may be formed by preparing the aqueous trace element solution in a pressure vessel fitted with a pressure gauge near its top and adding $CO_2$ until a predetermined pressure greater than one atmosphere is indicated. The addition is desirably made through a drop tube extending to near the bottom of the vessel so that the gas bubbles agitate the solution as they rise to the surface and release the undissolved gas to the headspace within the container. Supplemental mechanical agitation may be employed to hasten the solution of the $CO_2$. As the $CO_2$ from the headspace goes into solution, the indicated pressure falls and more $CO_2$ is added to restore the pressure. If no agitation is employed, or if the agitation is not sufficiently intense, solution of $CO_2$ will proceed more slowly to equilibrium while the pressurized solution in the vessel or tank is awaiting use. The equilibrium pressure must be at least greater than one atmosphere and a pressure above about 25 p.s.i.g. is desirable. A still higher pressure of between about 50 and about 100 p.s.i.g. is preferred because the higher pressures provide superior atomization of the solution when it is sprayed onto the foliage of the plants. Pressures up to about 25 atmospheres may be employed if the storage vessel has adequate strength to withstand such pressure.

The size of the container may range from several fluid ounces, similar to the type used for carbonated beverages or beer, to containers holding many gallons of solution. The vessel interior is manufactured of a material resistant to the low pH of carbonic acid solution. A spray valve is fitted which is suitable to discharge the nutrient as a fine mist.

The packaged composition of this invention and its preparation will be better understood from the following example which is intended to be illustrative only and not limiting.

Preparation of Packaged Nutrient Solution

A solution of trace elements for application to foliage of plants was made by adding to 20 liters of water 30 milliliters of the following trace element solution

| Compound | Concentration |
|---|---|
| Boric acid; $H_3BO_4$ | 6.73 g./l. |
| Manganese sulfate; $MnSO_4 \cdot H_2O$ | 4.86 g./l. |
| Copper sulfate: $CuSO_4 \cdot 5H_2O$ | 0.25 g./l. |
| Molybdic acid: $MoO_3$ | 0.75 g./l. |
| Cobalt Nitrate: $Co(NO_3)_2 \cdot 6H_2O$ | 2.50 g./l. |
| Zinc acetate: $Zn(CH_3COO)_2 \cdot 2H_2O$ | 1.68 g./l. |

To this solution was then added 20 milliliters of a solution containing 189 grams per liter of chelated iron as sodium ferrous ethylenediamine tetra acetate.

Two gallons of this solution at room temperature were placed in a 2½-gallon vessel of the type used as a stored pressure fire extinguisher and having a drip tube and pressure gauge. The drop tube communicated with a valve and a nozzle adjusted to give a very fine spray or fog. The vessel was sealed and carbon dioxide from a cylinder was admitted and forced beneath the surface via the drop tube until the pressure gauge indicated 100 p.s.i. The $CO_2$ cylinder valve was closed and the vessel was inverted several times to agitate the contents and dissolve the $CO_2$. The gauge pressure fell to only a few p.s.i. and more $CO_2$ was added to restore the pressure to 100 p.s.i. and the tank was again inverted. The process was repeated until the pressure remained at 100 p.s.i. after inversion indicating that the solution was saturated with $CO_2$ and sufficient pressure was present in the headspace to discharge the solution as a fine mist.

Tomato plants were grown in a greenhouse by soilless culture methods but without a supply f minor nutrient elements. The plants wee thoroughly wetted with the highly carbonated minor element solution discharged under pressure several times each week during the life of the plants and particularly during bright sunlit afternoons. No harmful effects were noted on the foliar portions of the plants, but instead the plants exhibited a maximum growth rate and produced a bountiful harvest of excellent fruit.

Carbon dioxide applied as a carbonated solution directly to a growing plant is absorbed much more efficiently than when it is merely present in the surrounding atmosphere. Both carbon dioxide and essential plant nutrient elements may be easily applied by such a pressurized system at the most convenient and optimum time for rapid assimilation of both by the growing plant, that is under conditions of rapid growth and active photosynthesis.

While the invention has been described herein with reference to a package of moderate size and ready portability, it will be readily understood that much smaller units may be readily prepared which have a net content of only about one pound. Other packages within the scope of this invention may be so large that portability is impracticable and the solution is distributed to the growing plants by permanent or semipermanent permanent pipes.

When filling the pressure vessel, it is desired for economic reasons to charge an amount of materials sufficient to form a quantity of solution equal to more than about 50 percent of the total vessel capacity. Preferably the quantity of solution is equal to about 80 percent of the capacity of the vessel.

In the foregoing description and example the invention has been sufficiently disclosed so that, without further explanation, one skilled in the art is enabled to use the invention to the fullest extent.

I claim:

1. A pressurized package of foliar nutrient for plants comprising a sealed pressure vessel, a valve for discharging the vessel contents under pressure, and contents consisting essentially of an aqueous solution of micronutrients and $CO_2$ gas at superatmospheric pressure over said solution, said solution containing $CO_2$ in an amount of from more than 3 grams to about 50 grams per liter and substantially in equilibrium with the gas over said solution.

2. The package of claim 1 wherein the $CO_2$ gas over the solution is at a pressure of about 100 p.s.i.

3. The package of claim 1 wherein said solution occupies a major portion of the volume of the vessel.

4. The package of claim 1 wherein the $CO_2$ pressure is from about 25 p.s.i. to about 25 atmospheres.

5. The package of claim 1 wherein the pressure vessel is of metal and has an acid-resisting liner.

6. The package of claim 1 wherein the pressure vessel is of fiber-reinforced plastic.

* * * * *